United States Patent [19]

Anderson et al.

[11] Patent Number: 5,494,700
[45] Date of Patent: Feb. 27, 1996

[54] METHOD OF COATING A SUBSTRATE WITH A METAL OXIDE FILM FROM AN AQUEOUS SOLUTION COMPRISING A METAL CATION AND A POLYMERIZABLE ORGANIC SOLVENT

[75] Inventors: Harlan U. Anderson; Magdi M. Nasrallah; Chieh-Cheng Chen, all of Rolla, Mo.

[73] Assignee: The Curators of the University of Missouri, Columbia, Mo.

[21] Appl. No.: 222,860

[22] Filed: Apr. 5, 1994

[51] Int. Cl.$^6$ ................................................. B05D 5/12
[52] U.S. Cl. ........................ 427/115; 427/240; 427/376.2; 427/384
[58] Field of Search ..................... 427/115, 240, 427/376.2, 384

[56] References Cited

U.S. PATENT DOCUMENTS

| | | | |
|---|---|---|---|
| 3,330,697 | 7/1967 | Pechini | 117/215 |
| 4,957,673 | 9/1990 | Schroeder et al. | 264/60 |
| 5,114,702 | 5/1992 | Pederson et al. | 423/639 |
| 5,116,643 | 5/1992 | Miller et al. | 427/126.3 |
| 5,256,443 | 10/1993 | Tomita | 427/240 |
| 5,271,955 | 12/1993 | Maniar | 427/240 |

OTHER PUBLICATIONS

G. Yi et al, "Sol–Gel Processing of Complex Oxide Films", Ceramic Bulletin vol. 70 No. 7 1991, pp. 1173–1179.

J. Reed, "Introduction to the Principles of Ceramic Processing," John Wiley & Sons, New York, 1988 pp. 403–405.

Osamu Yamamoto and Tadashi Sasamoto "Indium tin oxide thin films prepared by thermal decomposition of ethylene glycol solution." Materials Research Society, vol. 7, No. 9 (Sep. 1992), pp. 2488–2491.

C. C. Chen, M. M. Nasrallah, H. U. Anderson, "Synthesis and Characterization of $(CeO_2)_{0.8}(SmO_{1.5})_{0.2}$ Thin Films from Polymeric Precursors", Journal of the Electrochemical Society vol. 140, No. 12, pp. 3555–3560, Dec. 1993.

C. C. Chen, M. M. Nasrallah, H. U. Anderson, "Synthesis and Characterization of YSZ Thin Film Electrolytes", presented Sep. 1993 at the 9th International Conference on Solid State Ionics, Hague, the Netherlands, pp. 1–18.

C. C. Chen, M. M. Nasrallah, H. U. Anderson, "Cathode/Electrolyte Interactions and Their Expected Impact on SOFC Performance", The Electrochemical Society Proceeding Series, PV–4, pp. 598–612, Apr. 1993.

C. C. Chen, M. M. Nasrallah, H. U. Anderson, "Preparation and Electrode Characteristics of Dense $La_{0.6}Sr_{0.2}Fe_{0.8}O_3$ Thin Film by Polymeric Precursors", The Electrochemical Society Proceeding Series, PV–4, pp. 252–266, Apr. 1993.

C. C. Chen, M. M. Nasrallah, H. U. Anderson, "Thin Film Electrolytes for Intermediate Temperature SOFC Application", pp. 515–518, 1992.

C. C. Chen, M. M. Nasrallah, H. U. Anderson, "Synthesis and Characterization of the $(CeO_2)_{0.5}(SmO_{1.5})_{0.2}$ Thin Films From Precursors", abstract of presentation made Apr. 1992 at the 94th American Ceramic Society Meeting.

H. U. Anderson, M. M. Nasrallah, F. D. Blum, M. S. Smith, "Polymeric Synthesis of Perovskite Powders and Films", National Institute of Standards and Technology, Special Publication 804, pp. 179–184, Jan. 1991.

H. U. Anderson, C. C. Chen, J. C. Wang, Pennell, "Synthesis of Conducting Oxide Films and Powers From Polymeric Precursors", Ceramic Powder Science III, pp. 749–755, 1990.

(List continued on next page.)

*Primary Examiner*—Benjamin Utech
*Attorney, Agent, or Firm*—Senniger, Powers, Leavitt & Roedel

[57] ABSTRACT

A method for preparing a substrate coated with a polycrystalline, metal oxide film using polymeric precursors. The oxide films prepared by the method of the present invention are dense (i.e., substantially free of cracks and pinholes) and may be used, for example, as an electrolyte or electrode in intermediate temperature solid oxide fuel cells (SOFCs) or as gas separation membranes.

16 Claims, 15 Drawing Sheets

OTHER PUBLICATIONS

C. C. Chen, H. U. Anderson, "Synthesis of $YBa_2Cu_3O_{7-x}$ Superconductor By the Ethylene Diamine Process", Advanced Advanced Materials Conference II Proceedings, pp. 520–530, 1989.

N. C. Eror, H. U. Anderson, "Polymeric Precursor of Ceramic Materials", Materials Research Society Symposia, Proceedings, vol. 73, pp. 571–577, 1986.

Bulent E. Yoldas, "Alumina Sol Preparations", Ceramic Bulletin vol. 54, pp. 289–290, 1974.

FTIR OF POLYMERIC PRECURSORS AS FUNCTION OF TIME

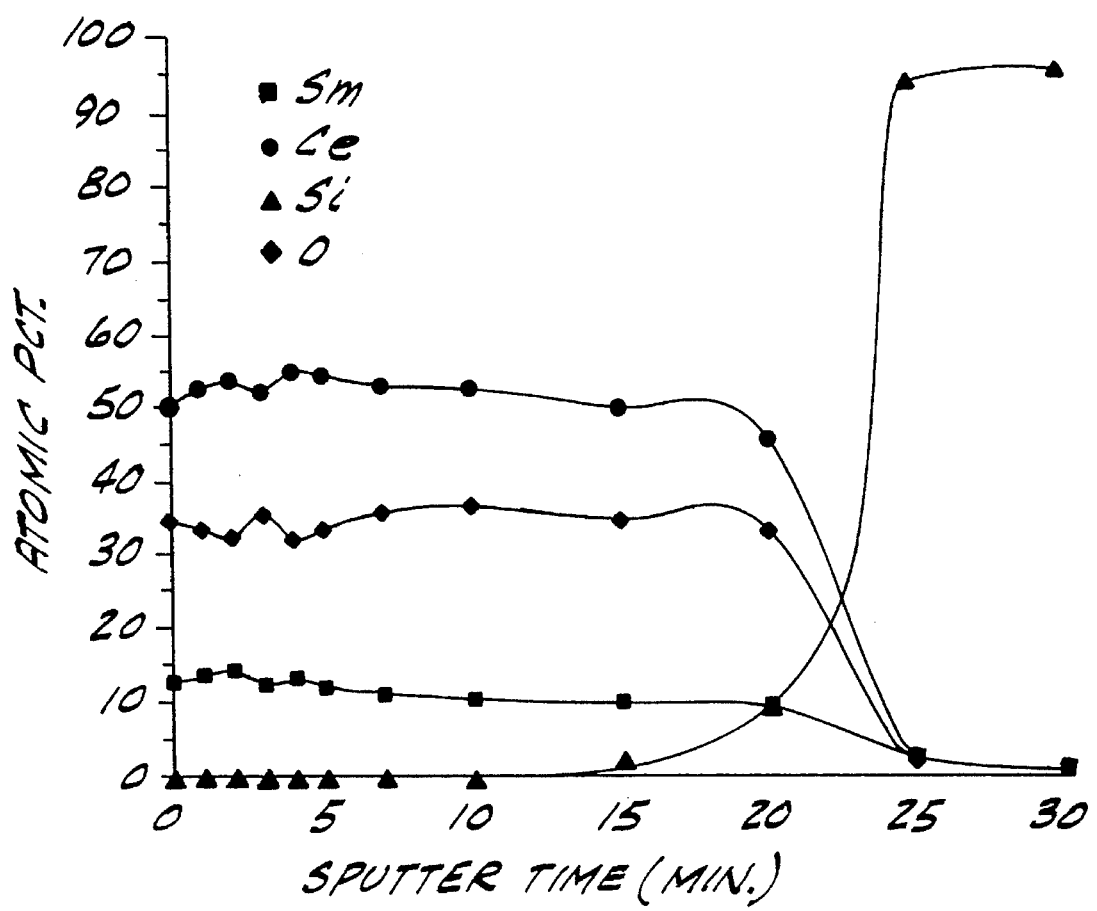

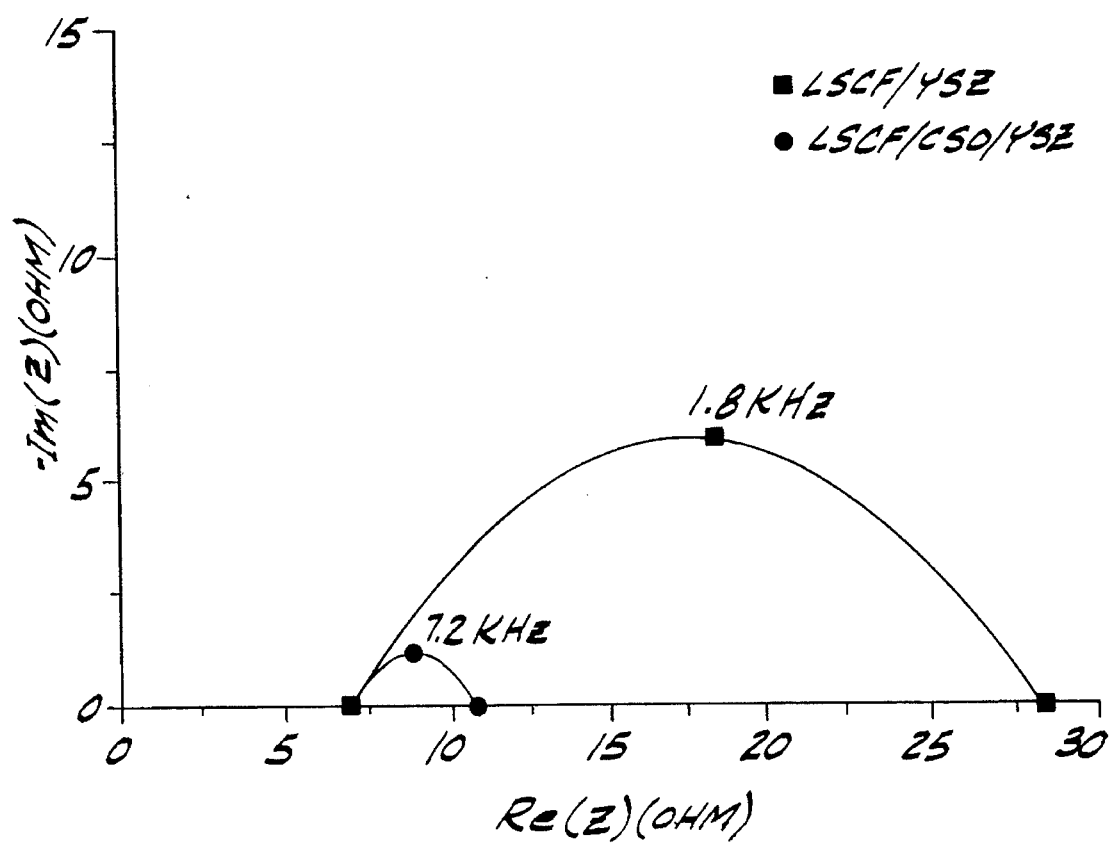

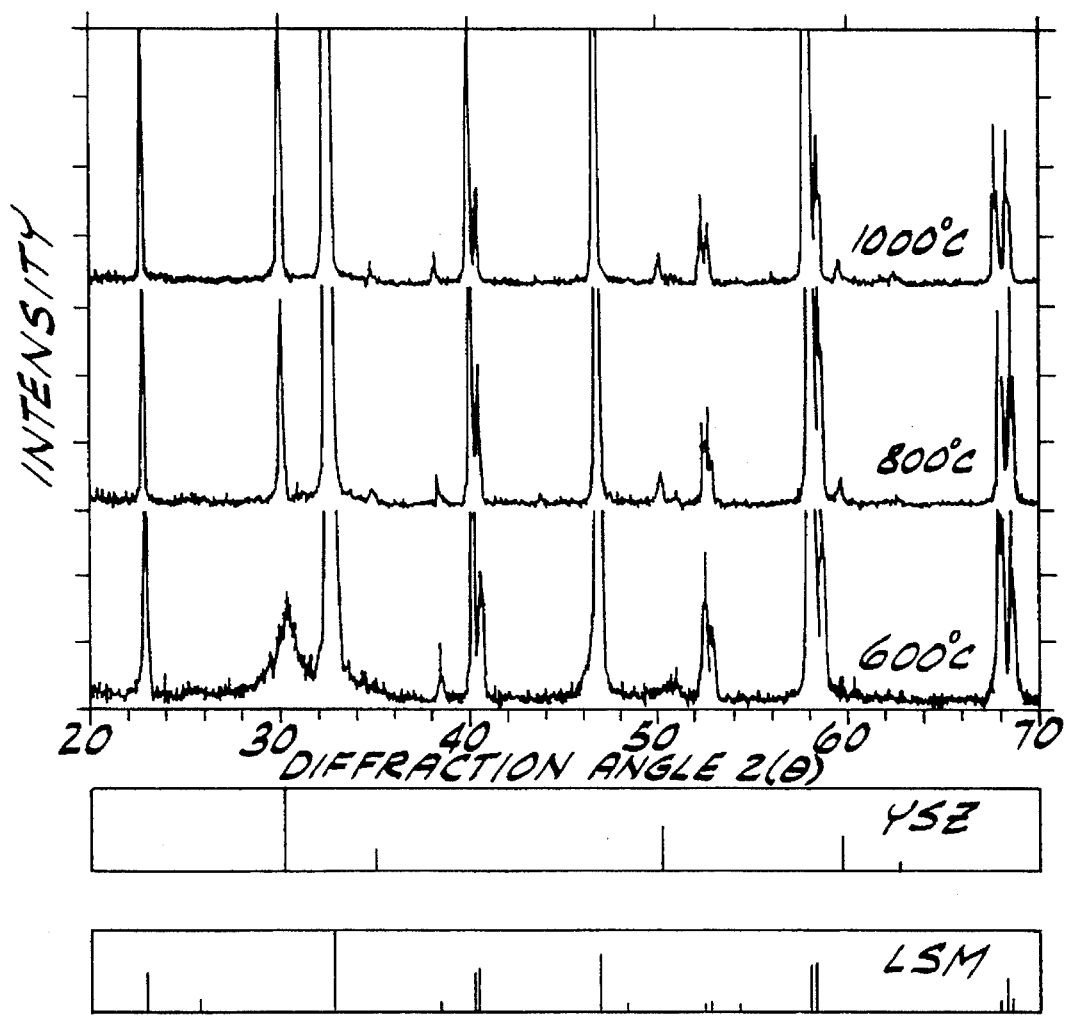

METHOD OF COATING A SUBSTRATE WITH A METAL OXIDE FILM FROM AN AQUEOUS SOLUTION COMPRISING A METAL CATION AND A POLYMERIZABLE ORGANIC SOLVENT

BACKGROUND OF THE INVENTION

The present invention relates to a method for preparing thin, polycrystalline metal oxide films. The films prepared by the method of the present invention are dense (i.e., substantially free of cracks and pinholes) and may be used, for example, as an electrolyte or electrode in intermediate temperature solid oxide fuel cells (SOFCs) or as gas separation membranes.

A fuel cell is a static device that converts the chemical energy in a fuel directly, isothermally, and continuously into electrical energy. Fuel and oxidant (typically oxygen in air) are fed to the cell in which an electrochemical reaction takes place that oxidizes the fuel, reduces the oxidant, and releases energy. The energy released is in both electrical and thermal forms, the electrical part providing the required output. In a typical power generation plant employing fuel cells, hydrocarbon fuel (e.g., natural gas) or gasified coal is reformed first to produce hydrogen-rich and sulphur-free gas that enters the fuel cell stack where it is electrochemically "burned" to produce the electrical and thermal outputs. The electrical output of a fuel cell is low-voltage high-current dc. By utilizing a properly organized stack of cells and an inverter, utility-grade ac output is obtained.

Fuel cells generating electricity from natural gas offer significant advantages over conventional power generation systems including improved reliability and safety and reduced airborne emissions. Also, since a fuel cell completely bypasses the thermal-to-mechanical conversion involved in a conventional power plant and since its operation is isothermal, fuel cells are not Carnot-limited. Efficiencies in the range of 43 to 55% are forecasted for modular dispersed generators featuring fuel cells. The possibility of using fuel cells in combined heat and power units provides the cleanest and most efficient energy system option utilizing valuable natural gas resources.

One of the most promising types of fuel cells being developed are SOFCs. SOFCs are particularly desirable as alternatives to conventional power sources due to their reliability, increased power-to-weight and power-to-volume ratios, simplicity, and environmental advantage over other types of fuel cells. These characteristics make SOFCs ideal for use in remote electrical power generation applications such as in space stations and satellites. Alternatively, SOFCs can be integrated with a coal gasifier and a steam bottoming cycle to form a more conventional electrical power generation system. The reliability of SOFCs is mainly attributed to stability of the components as well as the presence of low kinetic barriers at the electrode/electrolyte interfaces.

SOFCs are typically of planar or tubular construction and comprise layers or films of various polycrystalline metal oxides which form the electrolyte and electrode components of the fuel cell. The electrolyte of choice in state-of-the-art SOFCs is a film made from $(ZrO_2)_{1-x}(YO_{1.5})_x$ (YSZ), while suitable electrodes are comprised of films made from $La_{1-x}Sr_xMnO_3$ (LSM) or $La_{1-x}Sr_xCo_yFe_{1-y}O_3$ ( LSCF ). In the preceding formulas, x and y have values between 0 and 1 and can be varied to provide an oxide of the desired nominal composition.

Conventional SOFCs typically comprise a layer of YSZ electrolyte 40–160 μm thick and require operating temperatures of approximately 1000° C. to achieve adequate oxygen transport across the electrolyte. Conventional SOFC fabrication techniques require even higher temperatures. Reduction in fuel cell operating and fabrication temperatures will improve cell performance not only due to reduced interfacial resistance between the electrolyte and the cathode, but also due to a reduction in other related problems such as thermal stresses, interdiffusion, sealings and interconnections.

Reduced operating temperatures can be achieved by developing methods of preparing thinner metal oxide films for use as electrolytes and electrodes in SOFCs. A thinner electrolyte, for example, will provide a shorter path for ion transfer and will result in the electrolyte exhibiting less ohmic resistance at reduced temperatures (e.g., 600°–800° C.) as compared to conventional, thicker electrolytes.

Metal oxide films are also used as gas separation membranes. For example, a gas separation membrane comprised of a metal oxide film may be incorporated in an air pump used to separate pure oxygen from air. In such a device, the oxide film serves as a membrane which selectively transfers the desired component of the air mixture (i.e., oxygen) across the membrane.

Various attempts have been made to fabricate thin metal oxide films using electrochemical vapor deposition (EVD), plasma spraying, RF sputtering, spray pyrolysis, and sol-gel methods, etc. Among these various alternative methods, the sol-gel derived oxide films possess improved homogeneity, higher purity, and offer the advantage of processing a wide range of oxide compositions at somewhat lower temperatures as compared to the other synthesis techniques. However, sol-gel alkoxide precursors are moisture sensitive and their shelf-life is relatively short. Accordingly, a need exists for a film preparation method capable of providing high quality, thin, dense, polycrystalline metal oxide films at even lower processing temperatures. Dense films are particularly important in SOFC and gas separation membrane applications. On the other hand, lower processing temperatures are desirable because they decrease unwanted thermal interactions and interdiffusion between the film and the substrate on which the film is deposited as well as reduce the tendency for cracks and other discontinuities to form in the film.

SUMMARY OF THE INVENTION

Among the objects of the present invention, therefore, is the provision of a method for preparing thin, polycrystalline metal oxide films substantially free of cracks and pinholes; the provision of such a method wherein the processing temperature is reduced; and the provision of such a method capable of producing a wide variety of metal oxide films.

Briefly, therefore, the present invention is directed to a method for preparing a substrate coated with a polycrystalline metal oxide film. The method comprises first preparing a precipitate-free starting solution containing cations of the oxide's metal constituents dissolved in an aqueous mixture comprising a polymerizable organic solvent. The pH of the starting solution is controlled such that the solution remains substantially free of precipitates upon subsequent heating. The starting solution is then heated to form a polymeric precursor substantially free of precipitates. The polymeric precursor comprises a polymer containing the metal cations. The precursor is deposited on the substrate and the substrate is then spun to thereby coat the substrate with a thin film of the polymeric precursor. The deposited film of polymeric precursor is then calcined in the presence of oxygen and at a temperature not in excess of 600° C. to convert the film of polymeric precursor into the polycrystalline metal oxide film. The oxide film is substantially free of cracks or pinholes and exhibits a polycrystalline microstructure having a substantially uniform grain morphology and an average grain size less than about 0.5 μm.

Other objects and features of this invention will be in part apparent and in part pointed out hereinafter.

BRIEF DESCRIPTION OF THE DRAWINGS

FIG. 9 is an in-depth AES compositional profile for a CSO oxide film deposited on a Si substrate as prepared in Example 1. The oxide film was sputtered by Ar ions for 30 mins at a rate of 45 A/min.

FIG. 10 is complex impedance diagrams of LSCF/YSZ interface resistance at 1000° C. with and without a CSO oxide film as prepared in Example 1 interposed between the LSCF and YSZ.

FIG. 11 (b) is the cross-section SEM photomicrograph of a YSZ oxide film deposited on a dense LSCF substrate as prepared in Example 2.

FIG. 12 is the x-ray diffraction patterns showing the phase development of YSZ oxide films deposited on a porous LSM substrate as prepared in Example 2.

FIG. 14 (b) is a cross-section SEM of a LSCF oxide film deposited on a YSZ substrate after four spin-coatings and annealing at 600° C. for 2 hrs as prepared in Example 4.

DETAILED DESCRIPTION OF THE PREFERRED EMBODIMENTS

Figure 1:
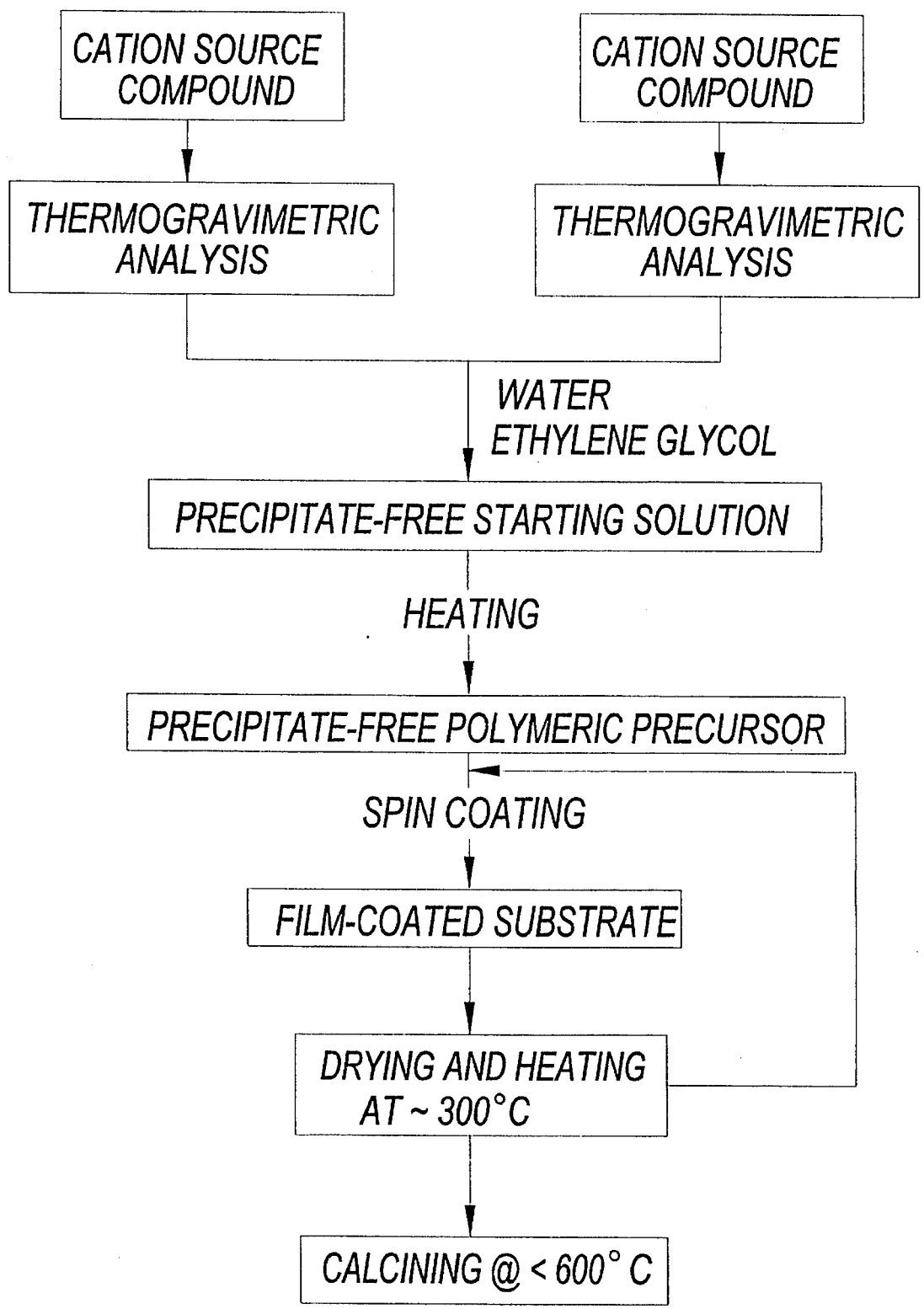
FIG. 1 is a flow chart for the metal oxide film synthesis method of the present invention.

In accordance with the present invention, a method is provided for preparing substrates coated with a thin, dense polycrystalline metal oxide film at relatively low processing temperatures. The process of the present invention may be used, for example, to produce components for intermediate temperature SOFCs or gas separation membranes.

The method of the present invention can be used to prepare substrates coated with thin films of a wide variety of polycrystalline metal oxides, including films comprised of "complex" metal oxides (i.e., oxides containing more than one cation constituent). In addition to YSZ, LSM and LSCF, other exemplary metal oxides which can be produced as thin films by the method of the present invention and which have particular application as components in intermediate temperature SOFC's include $(CeO_2)_{1-x}(SmO_{1.5})_x$ (CSO) as well as perovskite-type oxides, both doped (e.g., $La_{1-x}Mg_xCrO_3$) or undoped (e.g., $LaCrO_3$). In the preceding formulas, x has a value between 0 and 1 and can be varied to provide an oxide of the desired nominal composition. CSO oxide films may be used as a buffer layer in SOFCs to reduce interactions between the electrolyte and cathode while $La_{1-x}Mg_x$-$CrO_3$ may be used as interconnect material. In addition to SOFC applications, LSCF oxide films may be used as gas separation membranes. Other metal oxides which can be produced as thin films by the method of the present invention include: NiO, MgO, $Al_2O_3$, CaO, SrO, BaO, $TiO_2$, $Cr_2O_3$, $MnO_2$, $Fe_2O_3$, CuO, ZnO, $Y_2O_3$, $ZrO_2$, $Nb_2O_5$, $SnO_2$, $LaO_3$, $CeO_2$, $Sm_2O_3$ and combinations thereof.

For oxide films used in SOFC applications, the value of x is preferably between 0.02 and 0.10 for $(ZrO_2)_{1-x}(YO_{1.5})_x$ (YSZ), between 0.05 and 0.50 for $La_{1-x}Sr_xMnO_3$ (LSM) and between 0.05 and 0.20 for $(CeO_2)_{1-x}(SmO_{1.5})_x$ (CSO). Moreover, for oxide compositions of $La_{1-x}Sr_xCo_yFe_{1-y}O_3$ (LSCF) used in SOFC applications, the value of x is preferably between 0.1 and 0.8 and the value of y is preferably between 0 and 1.

The substrates on which the metal oxide films are deposited will vary depending upon the intended application of the oxide-coated substrate. In SOFC applications, both the substrate and the oxide film itself typically serve as a component of the SOFC. For example, a film of LSM or LSCF may be deposited onto a substrate comprised of YSZ. In the resulting structure, the LSM or LSCF film serves as an electrode while the YSZ substrate serves as an electrolyte. Optionally, a film of YSZ may be deposited onto an LSM or LSCF substrate. Thus, when the coated substrate is intended to be used in SOFC applications, both the material selected to comprise the substrate as well as the oxide film itself should be compatible with their intended function in the SOFC.

In gas separation applications, the substrate on which the metal oxide membrane is deposited must be sufficiently porous to allow transport of the selected gas component across the substrate/membrane boundary and should not react with the metal oxide membrane under operating conditions. Typically, the substrate used in gas separation applications has an average pore diameter in excess of about 5 μm. In any event, regardless of the intended use of the oxide-coated substrate, by controlling various process parameters as will be described herein, the porosity of the substrate may vary considerably and satisfactory results still achieved.

Referring to FIG. 1, a flow chart for the film synthesis method of the present invention is shown. Generally, the method comprises: (1) preparing a precipitate-free starting solution containing cations of the desired oxide's metal constituents dissolved in an aqueous mixture comprising a polymerizable organic solvent (e.g., ethylene glycol); (2) heating the starting solution to form a polymeric precursor free of precipitates and comprising a polymer containing the metal cations; (3) depositing a thin film of the polymeric precursor onto a substrate using a spin-coating technique; and (4) calcining the deposited film of polymeric precursor in the presence of oxygen to convert the film of polymeric precursor into the polycrystalline metal oxide film.

The starting solution is prepared by dissolving a source compound for cations of the oxide's metal constituents in an aqueous mixture comprising a polymerizable organic solvent. Suitable organic solvents include those having carbonyl functional groups capable of polymerization. Preferably, the organic solvent is ethylene glycol. The cation source compounds suitable for use in this invention are those which exhibit substantial solubility in aqueous solutions and include nitrates, chlorides, carbonates, alkoxides and hydroxides of the appropriate metals in addition to the metals themselves. Preferably, the cation source compounds are nitrates, chlorides or carbonates, either hydrated or anhydrous, since these compounds are relatively inexpensive, easily accessible, and readily soluble in aqueous solutions. Preferably, the cation source compounds are first standardized thermogravimetrically in order to confirm their actual metal content and ensure that the final oxide will have the desired nominal composition. After standardization, appropriate amounts of the cation source compounds are completely dissolved in the starting solution, the amount dissolved being calculated on the basis of the desired nominal composition of the oxide and the total amount of the oxide to be prepared.

The starting solution is then heated to expel water and other volatile components of the starting solution and form a viscous polymeric precursor comprising a polymer containing the metal cations. It is critical that the cations remain in solution throughout the polymerization process. The formation of precipitates may lead to inhomogeneities and a nonuniform metal distribution in the resulting oxide as well as lead to the formation of cracks or pinholes in the oxide film. Precipitation is prevented by controlling the pH of the starting solution. The specific pH range of a starting solution which will prevent precipitation upon polymerization is dependant upon the particular metal oxide system and may be determined experimentally. This can be done by preparing several samples of the starting solution for a particular metal oxide system, each sample varying incrementally in pH, and then observing which starting solution(s) yield a precipitate-free precursor upon subsequent heating.

The pH of the starting solution can be varied, for example, by adding a neutral, acidic or basic pH control agent to the starting solution. An example of a suitable neutral pH control agent is glycine. Examples of suitable acidic pH control agents include: nitric acid, hydrochloric acid, citric acid and oxalic acid. Examples of suitable basic pH control agents include: ammonium hydroxide and ethylene diamine. Although citric acid and ethylene diamine may be added to the starting solution to control pH, these two pH control agents are less preferred because they are believed to promote crosslinking in the polymeric precursor which may lead to nonuniform shrinkage of the film upon subsequent heat treatment and result in cracking of the oxide film.

Table 1 identifies a suitable pH control agent and a pH range for the starting solution of several oxide systems which will provide a precipitate-free polymeric precursor upon subsequent heating.

| Oxide System | pH Range | pH Control Agent |
| --- | --- | --- |
| $La_{1-x}Sr_xMnO_3$ | pH < 2 | $HNO_3$ |
| $(CeO_2)_{1-x}(SmO_{1.5})_x$ | 1 < pH < 7 | $HNO_3$ or glycine |
| $(ZrO_2)_{1-x}(YO_{1.5})_x$ | 6 < pH < 7 | glycine |
| $La_{1-x}Sr_xCo_yFe_{1-y}O_3$ | 6 < pH < 7 | glycine |
| NiO | pH < 2 | $HNO_3$ |
| MgO | pH < 2 | $HNO_3$ |

Once the precipitate-free starting solution has been formed, the solution is heated by any convenient means, such as by placing the vessel containing the starting solution onto a hot plate. The starting solution is heated to a temperature between about 25° and about 100° C., and preferably between about 60° and about 80° C., until the desired viscosity of the polymeric precursor is obtained. In order to ensure uniform heating, the starting solution is preferably stirred while heating. Depending upon the quantity of precursor being prepared, polymerization and formation of the polymeric precursor having the desired viscosity typically takes several hours of heating.

Controlling the viscosity of the polymeric precursor is important in order to obtain high quality oxide films. In general, precursors with a viscosity below about 50 centipoise (cP) at 25° C. as measured on a Brooksfield viscometer, Model No. DVII will not uniformly wet a smooth substrate such as a silicon wafer. On the other hand, highly viscous solutions having a viscosity greater than about 500 cP at 25° C. produce inhomogeneous films and lead to possible crack formation unless the substrate is heated to higher temperatures. In order to produce high quality films, the viscosity of the precursor should be between about 50 and about 500 cP at 25° C., and preferably between about 90 and about 190 cP at 25° C. The viscosity of the polymeric precursor is adjusted by controlling the heating time and temperature of the starting solution. Generally, the longer the heating time and the higher the heating temperature, the higher will be the viscosity of the polymeric precursor.

Figure 2:
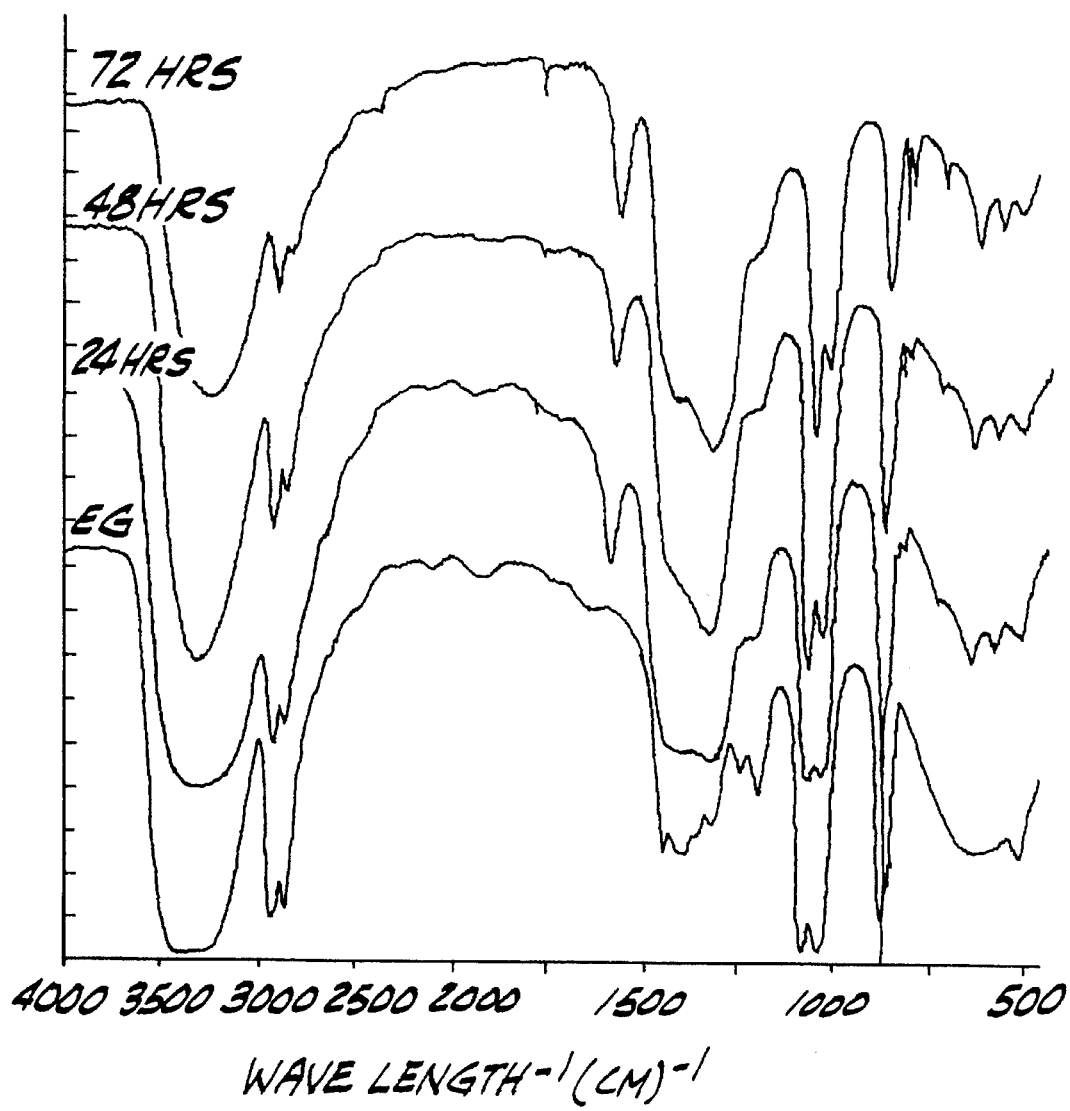
FIG. 2 is the FTIR transmission spectra of ethylene glycol and the polymeric precursor for $(CeO_2)_{0.8}(SmO_{1.5})_{0.2}$ as a function of heating time.

The structure of the polymer formed upon heating the starting solution and the polymerization mechanism for a CSO oxide system having a nominal composition of $(CeO_2)_{0.8}(SmO_{1.5})_{0.2}$ was investigated using Fourier transform infrared spectroscopy (FTIR). The starting solution for the CSO system analyzed was formed by dissolving appropriate quantities of standardized reagent grade $Ce(NO_3)_3 \cdot 6H_2O$ and $Sm(NO_3)_3 \cdot 6H_2O$ in an aqueous mixture of 10 ml distilled water, 40 ml ethylene glycol and 10 ml concentrated nitric acid. The FTIR spectra of the polymeric precursor for the CSO oxide system was taken as a function of starting solution heating time and compared to the FTIR spectra of ethylene glycol. FIG. 2 shows the FTIR transmission spectra of ethylene glycol and the polymeric precursor for $(CeO_2)_{0.8}(SmO_{1.5})_{0.2}$ after heating the starting solution for 24, 48 and 72 hours at a temperature of about 80° C. By identifying changes in molecular structure of the precursor during heating relative to ethylene glycol, the mechanism of the polymerization process and a proposed structure of the polymer for the CSO oxide system was determined. The results, shown in FIG. 2, suggest the following structural changes upon heating of the polymeric precursor:

1. Strong absorption at about 1600 $cm^{-1}$ indicates the presence of C=O groups after 24 hours of heating time. The absorption intensity increases with increasing heating time.

2. The strong absorption in the 1338 cm$^{-1}$ range is attributable to the stretching mode of the O—C=O group after 24 hours of heating time.
3. The decrease in intensity of the C—H stretching (2950 to 2880 cm$^{-1}$) indicates the oxidation of ethylene glycol.
4. The new absorption bands in the range of 770 cm$^{-1}$ after 24 hours heating time indicates the existence of oxalate ions.
5. The weak absorption bands observed in the range of 330 to 650 cm$^{-1}$, indicates the presence of metal-oxygen bonds in the structure.

Although the present invention is not limited to such a theory, the results of the FTIR investigation suggest that the structure of the polymer for the CSO system contains ethylene glycol and oxalate ion groups. The metal cations are chelated to the oxalate ion groups to form a coordination complex. The proposed polymerization mechanism for the CSO system as well as the resulting polymeric unit are shown below.

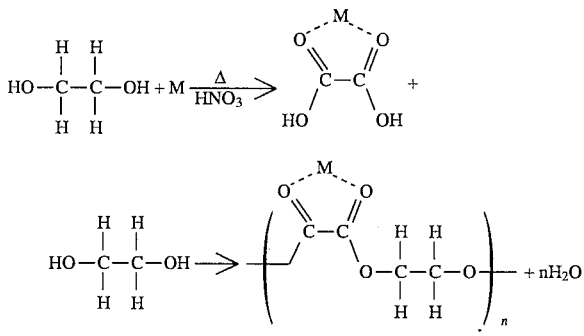

As can be seen, it is believed that in this CSO system, the nitric acid present in the starting solution oxidizes the ethylene glycol and converts it to oxalic acid which then forms a polyester having a metal cation chelated to the deprotonated carboxylic groups. This process involves considerably less three-dimensional cross-linking as compared to previous liquid mix methods. Accordingly, the polymer formed is believed to be substantially linear, providing relatively uniform shrinkage upon subsequent heat treatment of the deposited film. Specifically, the method of the present invention is believed to provide a polymeric precursor such that shrinkage of the film of polymeric precursor deposited on the substrate occurs primarily in the direction perpendicular to the surface of the substrate upon subsequent calcination due to the substantially linear nature of the polymeric precursor.

Once the polymeric precursor has been formed, a film of the precursor is deposited on the substrate using a conventional spin-coating technique. First, a sufficient quantity of the precursor is placed on the substrate. The substrate is then spun, such that centrifugal forces spread the precursor across the surface of the substrate, thereby coating the substrate with a thin film of the precursor. Suitable spin-coating apparatus for use in the method of the present invention include those available from Brewer Science, Inc., Rolla, Mo. 65401, such as Model Nos. 100 and 100CB.

By controlling the viscosity of the precursor, the spinning speed and the spinning time, the thickness of the oxide film obtained upon subsequent heat treatment may be controlled. Furthermore, by controlling these various parameters, the polymeric precursors can be deposited uniformly on substrates of varying porosity. Generally, thicker films are produced by increasing the viscosity of the precursor and/or decreasing the spinning speed and/or spinning time. Also, as the porosity of the substrate increases, it is generally desirable to increase the viscosity and/or decrease the spinning speed and spinning time. For precursors having a viscosity between about 90 and 190 cP at 25° C., the substrate spinning rate is typically between about 1500 and about 3000 rpm.

Preferably, the viscosity of the precursor and the spinning of the substrate are controlled such that the thickness of the oxide film obtained from a single spin-coating does not exceed about 0.5 μm and, preferably does not exceed about 0.3 μm. A maximum oxide film thickness not in excess of about 0.5 μm is preferred because there is a greater tendency for gaseous volatiles to be trapped within thicker oxide films obtained from a single spin-coating. Trapped gases form blisters or bubbles within the oxide film when the film of polymeric precursor deposited on the substrate is subjected to calcination. This results in cracking of the oxide film as well as poor adhesion between the oxide film and the substrate. If oxide films thicker than 0.5 μm are desired, it is preferred that they be formed using multiple spin-coatings as described below.

Once a thin film of the precursor has been deposited on the substrate by spin-coating, the as-deposited film is thermally converted into the desired oxide by heat treating the coated substrate. Heat treating the coated substrate is preferably conducted in several steps in order to ensure a dense film is formed. First, the coated substrate is dried at a temperature of about 80° C. for a time sufficient to evaporate any remaining solvent from the precursor. Drying the coated substrate at relatively low temperatures to remove solvent prior to subjecting the coated substrate to higher calcining temperatures tends to reduce the formation of gaseous volatiles which may cause the oxide film to crack. Drying of the deposited film can be carried out using any suitable heating apparatus such as a hot plate, laboratory oven or infra red lamp.

Once dried, the coated substrate is heated to a temperature not in excess of about 300° C. and preferably not in excess of about 250° C. for a time sufficient to burn-out the organic components of the film and convert the coating on the substrate into a substantially solid, amorphous oxide. Formation of the polycrystalline microstructure and grain growth are achieved by calcining the amorphous film in the presence of oxygen at temperatures not in excess of about 600° C., preferably in the range of about 300° to about 600° C. Calcining is preferably discontinued prior to the average grain size exceeding about 0.5 μm, and preferably prior to the average grain size exceeding about 0.2 μm. Calcining temperatures above about 600° C. tend to cause unwanted thermal interaction between the film and substrate as well as rapid grain growth. Furthermore, it is believed that an average grain size above about 0.5 μm leads to voiding (i.e., crack formation) in polycrystalline oxide films having a thickness less than about 0.5 μm.

If an oxide film having a thickness greater than about 0.5 μm is desired, the above-described method is modified in the following manner. Once the first deposited film of the precursor has been converted into a solid, amorphous oxide by drying and heating, successive films of the amorphous oxide are applied by depositing additional precursor on the coated substrate, spinning the substrate and then drying and heating each additional layer until a composite film of the desired overall thickness has been deposited on the substrate. Once the desired thickness has been obtained, the film is calcined as described above to produce the polycrystalline metal oxide. The thickness of each successive, amorphous oxide film deposited on the substrate preferably does not exceed 0.5 μm.

The present invention is illustrated by the following examples which are merely for the purpose of illustration and are not to be regarded as limiting the scope of the invention or manner in which it may be practiced.

EXAMPLE I

CSO Thin Film

Preparation of the Precursor Solution

A starting solution with a nominal Ce:Sm composition of 0.8:0.2 (molar ratio) was prepared using reagent grade $Ce(NO_3)_3$ $6H_2O$ and $Sm(NO_3)_3$ $6H_2O$ as cation source compounds. These materials were standardized thermogravimetrically to confirm the actual cation contents. Appropriate quantities of these materials to include in the starting solution were then calculated on the basis of obtaining 0.02 mole of the oxide having the desired nominal composition. Measured amounts of the cation source compounds were then mixed with 10 ml distilled water, 40 ml ethylene glycol and 10 ml concentrated nitric acid in a 100 ml beaker to form a precipitate-free starting solution. The starting solution was heated on a hot plate at about 80° C. to expel the water and other volatile matter until it turned to a viscous liquid.

Figure 3:
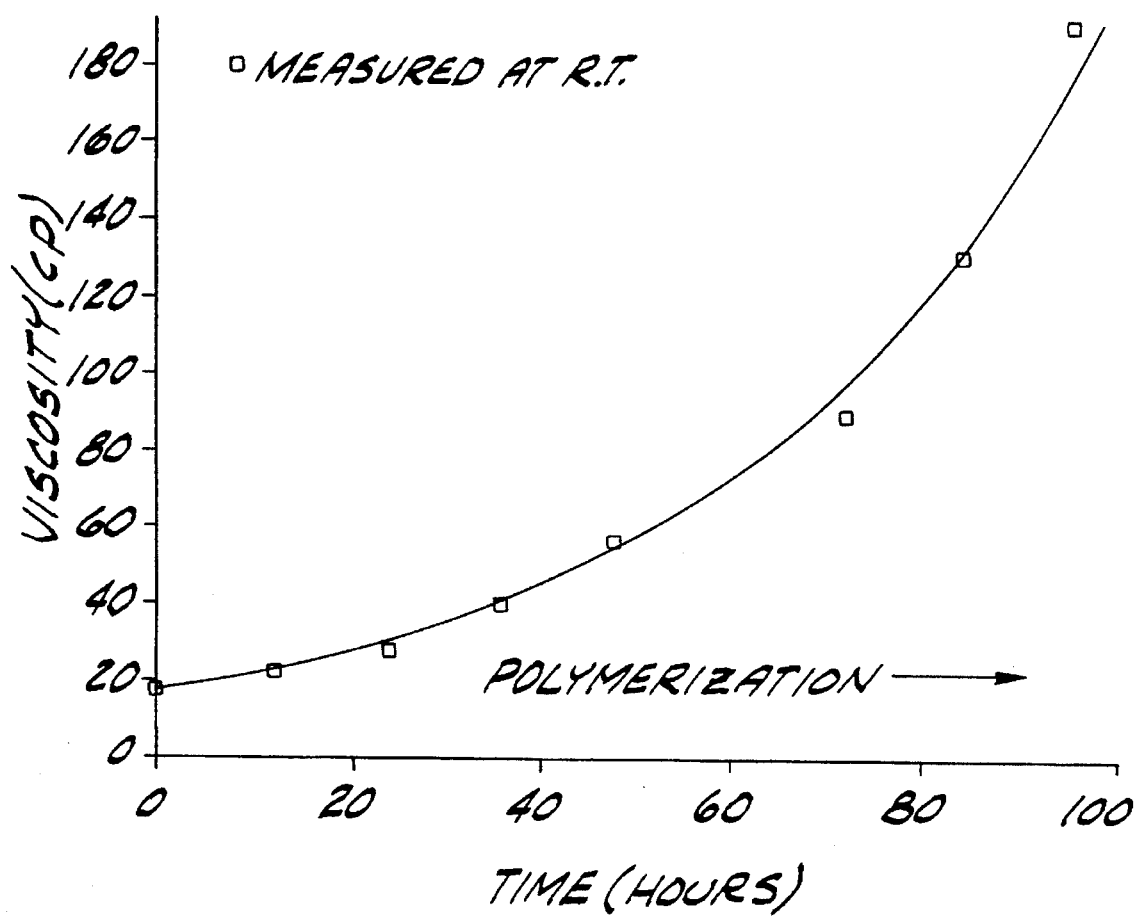
FIG. 3 shows the change in viscosity of the polymeric precursor as function of starting solution heating time for the CSO oxide film prepared in Example 1.
Figure 4A:
FIGS. 4 (A), 4 (B), 4 (C) and 4 (D) show the 3-D atomic force microscopy (AFM) micrographs for the CSO oxide film deposited on a Si substrate in Example 1. The as-deposited films were fast fired for 1 minute at 320°, 400°, 600°, and 800° C., respectively.
Figure 4B:
Figure 4C:
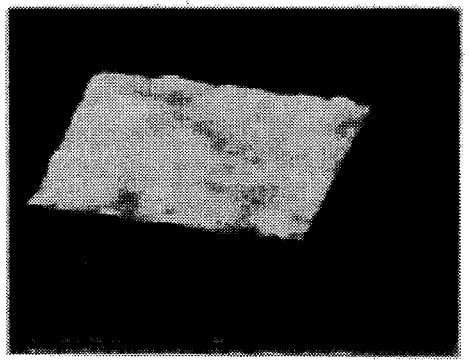
Figure 4D:
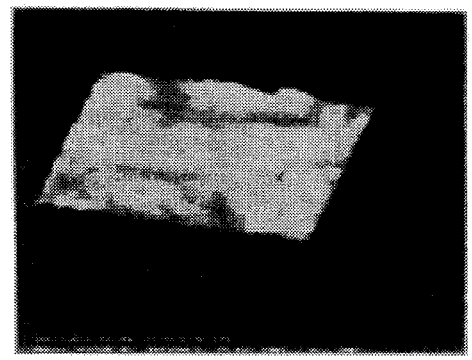

The change in the viscosity of the solution due to polymerization was measured at room temperature by means of a Brookfield viscometer, Model No DVII. FIG. 3 shows the change in viscosity of the polymeric precursor as function of heating time. The viscosity of the precursor increases significantly with increased heating time due to the increase in average molecular weight as a result of polymerization.

Deposition and Formation of the Dense Films

A spin-coating technique was used to form wet films of the precursor on various substrates. A few drops of the viscous precursor were deposited onto the substrate which was fixed on a spinning disk. The film thickness was established by controlling the spinning speed, the spinning time, and the viscosity of the precursor. Generally, the thickness of the deposited films increased with increasing viscosity of the precursor and decreasing the spinning speed and time. In general, precursors with viscosity below 50 cp at 25° C. could not homogeneously wet a smooth substrate, such as a Si wafer or a glass. On the other hand, highly viscous precursors having a viscosity above about 500 cP at 25° C. resulted in inhomogeneous films and crack formation unless the substrate was heated at higher temperatures. Therefore, it is important to control the viscosity of the solution to obtain high quality films. The viscosity of the precursor solutions used in this Example ranged between 90 and 190 cP at 25° C. With a spinning speed of between about 2000 and about 3000 rpm, dense oxide films were obtained having a thickness in the range of about 0.1 to about 0.3 μm for each coating after firing at about 600° C.

After spin-coating, the as-deposited films of the precursor were dried on a hot plate at about 80° C. for 1 minute then placed directly on a preheated hot plate at about 320° C. or in a tube-furnace at about 400° to 800° C. for 1 minute and quenched in air. The sample temperature was monitored by a thermocouple. Thicker films were produced by multiple coatings with drying and heat-treatment after each coating. No inhomogeneities were observed due to multiple spin-coatings.

To decrease the processing time and the interdiffusion between the CSO oxide film and the substrate, a rapid thermal annealing (fast firing) process was adopted. FIGS. 4 (a)–(d) show the 3-D atomic force microscopy (AFM) micrographs for the CSO oxide film deposited on a Si substrate. The oxide films shown in FIGS. 4 (a)–(d) were prepared from a precursor having a viscosity of about 90 cP at 25° C. and using a spinning speed of about 2500 rpm. The as-deposited films were then fast fired for 1 minute at 320°, 400°, 600°, and 800° C., respectively. The films appear to be smooth and crack-free with a grain size of about 0.1 μm at firing temperatures below 600° C. Some microcracks can be observed in the film heated at 800° C. (See FIG. 4 (d)). Accordingly, the fast firing process for making dense CSO films is suggested at temperatures below 600° C.

Figure 5:
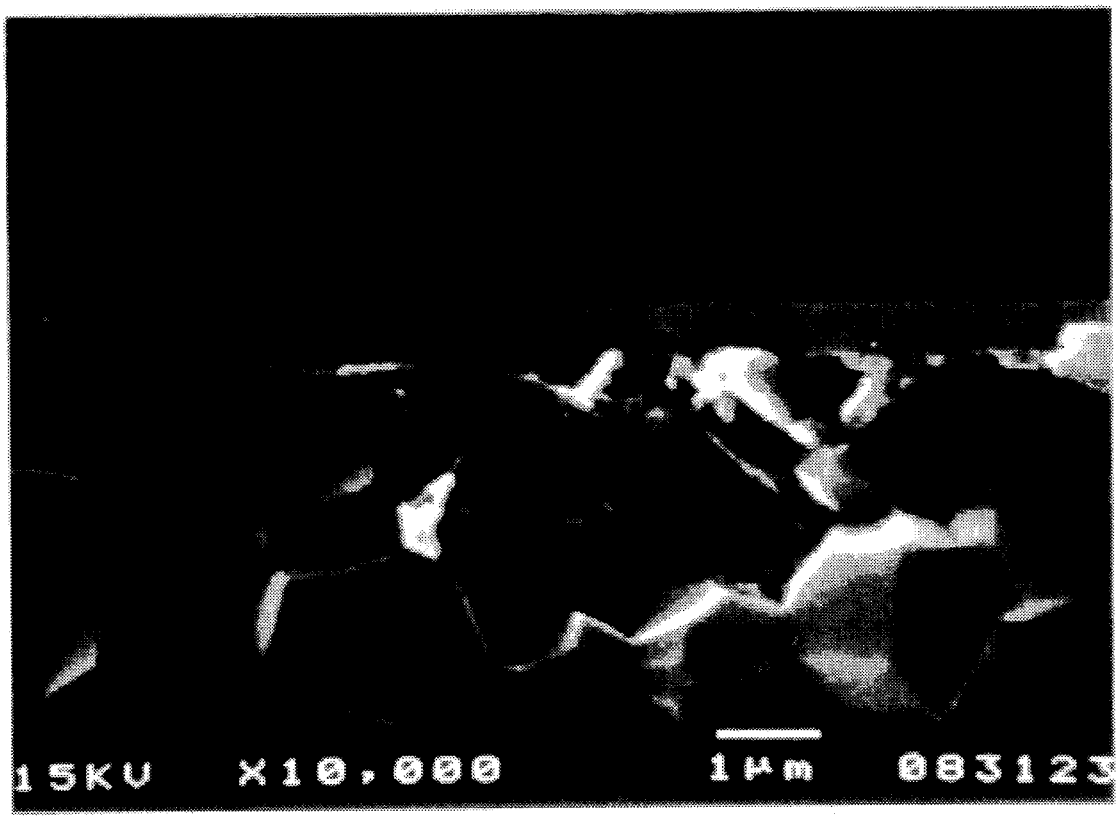
FIG. 5 is the cross-section SEM micrograph of a CSO oxide film deposited on a LSCF substrate as prepared in Example 1 after five spin-coatings and fast firing at 600° C. for 1 min.

FIG. 5 shows a cross-sectional SEM micrograph of a CSO oxide film deposited on a LSCF substrate after five spin-coatings and fast firing at 600° C. for 1 min. The deposited film is 0.5 μm in thickness and appears to be highly dense and uniform.

Characterization of the CSO films

Figure 6:
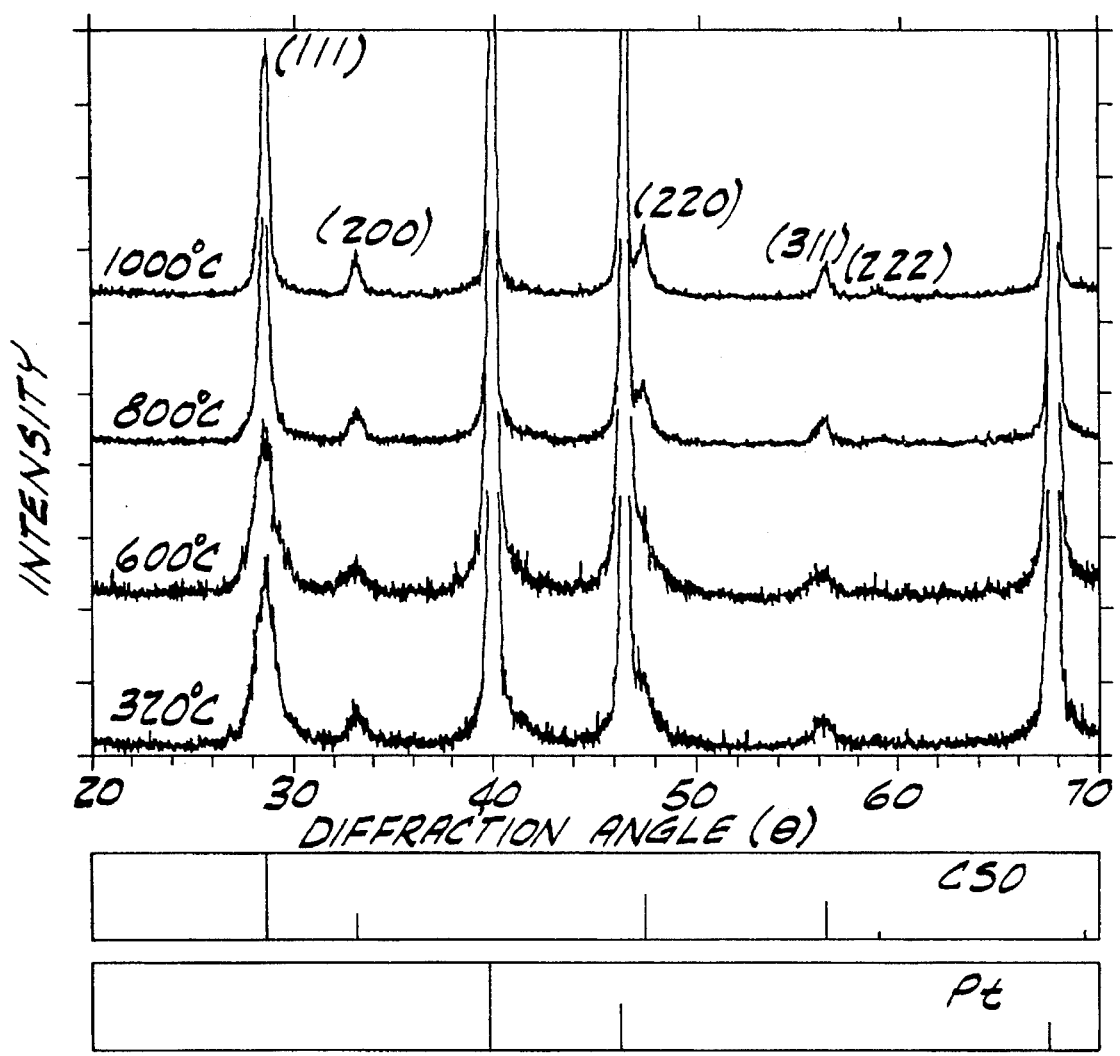
FIG. 6 is the x-ray diffraction patterns showing phase development of a CSO oxide film deposited on a Pt substrate as prepared in Example 1.
Figure 7:
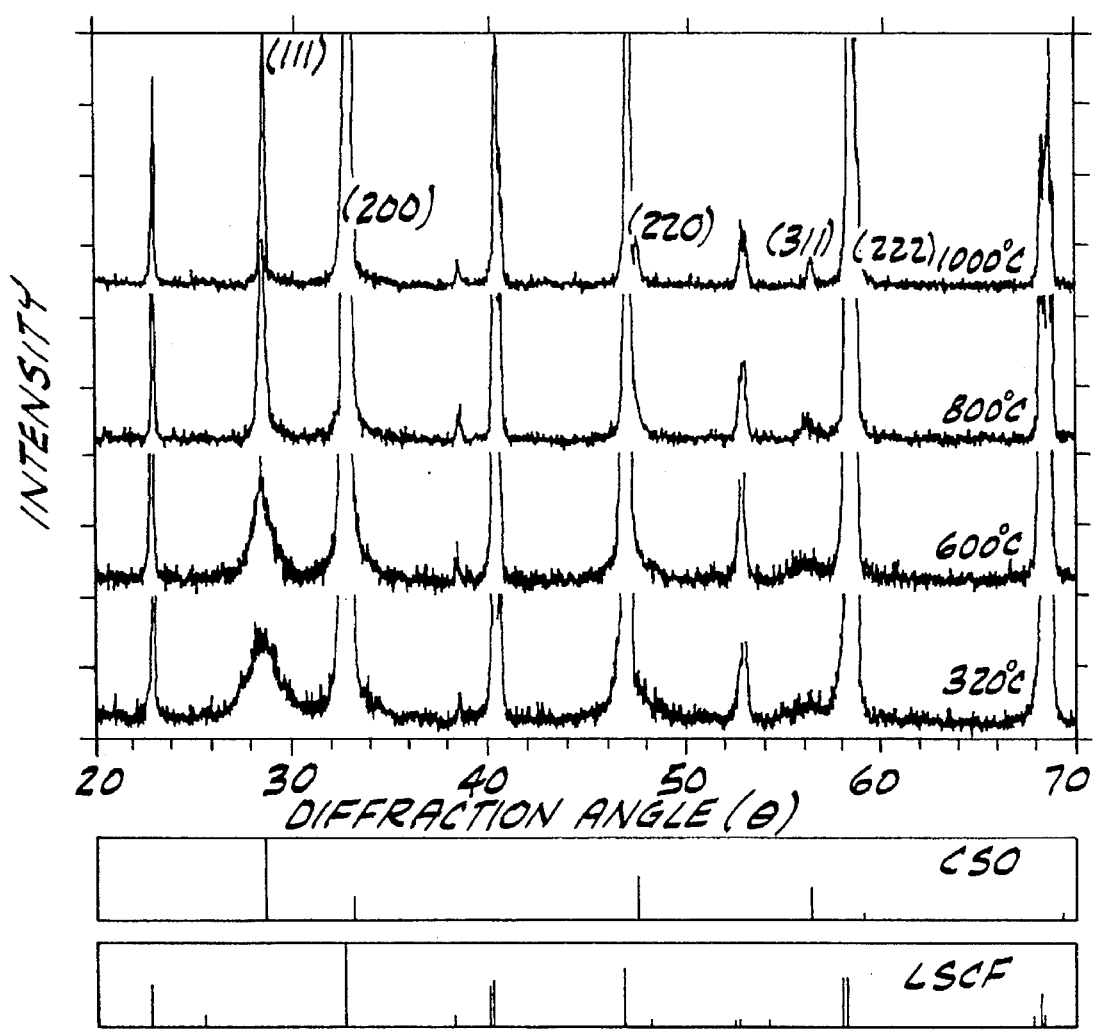
FIG. 7 is the x-ray diffraction patterns showing phase development of a CSO oxide film deposited on a LSCF substrate as prepared in Example 1.

The phase development of CSO oxide films deposited on Pt and LSCF substrates were studied by x-ray diffraction analysis performed on a Scintag diffractimeter, using Cu Kα radiation. The results are shown in FIGS. 6 and 7, respectively. The formation of the cubic fluorite structure is observed at temperatures as low as 320° C. on both Pt and LSCF substrates. It is not uncommon for Pt and LSCF, both possessing good catalytic properties, to act as nucleating sites, allowing CSO nuclei to form on the surface at relatively lower temperatures and thus accelerating the crystallization process of CSO. Similar behavior has been observed for PZT films on Pt substrates. The absence of other impurity or nonstoichiometric phases shows that the composition of the film is as intended. FIGS. 6 and 7 also show that the CSO film is not reactive with either Pt or LSCF substrates up to 1000° C.

Figure 8:
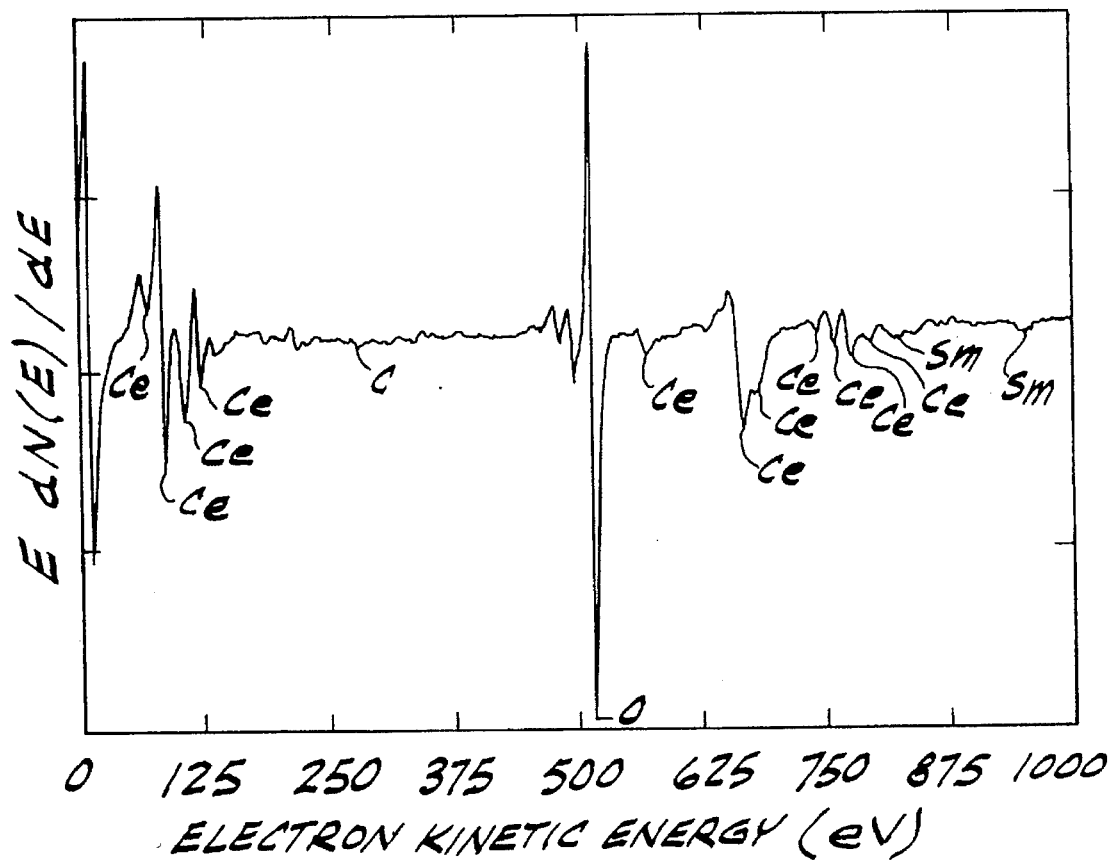
FIG. 8 is a surface Auger electron spectroscope (AES) spectrum of a CSO oxide film deposited on a Si substrate as prepared in Example 1.

A PHI 545 Auger electron spectroscope (AES) was used to study the surface and bulk composition of a CSO oxide film deposited on a Si substrate. A surface Auger spectrum of the film, after annealing at 600° C. for 30 minutes, is shown in FIG. 8. Only Ce, Sm, and O atoms were detected with a small amount of carbon and argon (about the detection limit of the AES). This shows that the purity of the CSO oxide films is fairly high.

The in-depth AES compositional profile for the CSO oxide film deposited on a Si substrate is shown in FIG. 9. The film was sputtered by Ar ions for 30 mins at a rate of 45 A/min. FIG. 9 shows a fairly constant Ce/Sm atomic ratio of about 4:1 extending to a depth of about 0.1μm from the surface of the oxide film. This indicates that our process provides good stoichiometric control and oxide composition homogeneity. A well-defined film/substrate interface is also observed, indicating that no significant interdiffusion between the CSO film and the Si substrate occurred.

AC impedance spectroscopy was used to study the LSCF/YSZ interfacial resistance with and without a CSO buffer layer. These studies were carried out by a two-electrode method (two symmetric-electrode cell) using a Schlumberger 1260 impedance analyzer. Pt mesh, pressed to the sample by a spring, was used as the current collector, a small ac signal (<10 mV) was employed, without a dc bias voltage. A trilayer of LSCF/CSO/YSZ was made by first depositing a CSO oxide film (approximately 0.1 μm thick) onto a YSZ substrate by multiple spin-coatings and then slurry coating a porous LSCF electrode onto the CSO oxide film. This structure was then heated to 1100° C. for 2 h. The developed trilayer was tested and compared with the LSCF/YSZ system without a CSO oxide layer. FIG. 10 shows the complex impedance diagrams of LSCF/YSZ interfacial resistance at 1000° C., with and without a CSO oxide film interposed between LSCF and YSZ as a buffer layer. With the frequency sweep, equivalent electrical circuits of the electrode processes were obtained and the components resolved, thus identifying the electrode/electrolyte interfacial resistance. The interfacial resistance was calculated from the difference of the real-axis intercepts of the semicircle. The larger the semicircle the higher the interfacial resistance, and lower the cell performance. The intercept of the real-axis, at the high frequency end of the semicircle, gives the bulk resistance of the electrolyte. FIG. 10 shows that upon incorporation of the CSO oxide film between LSCF and YSZ, a significant reduction in interfacial resistance (small semicircle) was observed. It also shows that the bulk resistance of the electrolyte did not change after applying the CSO buffer layer. Thus, CSO can serve as a protective layer impeding the interactions between LSCF and YSZ that were previously observed and resulted in the formation of $LaZr_2O_7$ and $SrZrO_3$ that dramatically increased interfacial resistance. Interaction studies on LSCF/CSO, LSM/CSO, and YSZ/CSO bilayer systems showed that no reaction products are formed at the interface at temperatures up to 1200° C. Accordingly, the presence of CSO buffer between LSCF and YSZ will eliminate the possibility of second-phase formation and will improve cell performance at temperatures up to 1000° C.

EXAMPLE II

YSZ Thin Film

Preparation of the Precursor Solution

A starting solution with a nominal Zr:Y composition of 0.84:0.16 (molar ratio) was prepared using reagent grade Zirconyl Chloride hydrate ($ZrOCl_2.8H_2O$) and Yttrium nitrate hydrate ($Y(NO_3)3.6H_2O$). These materials were standardized thermogravimetrically to confirm the actual cation contents. Appropriate quantities of these materials to include in the starting solution were then calculated on the basis of obtaining 0.02 mole of the oxide having the desired nominal composition. Measured quantities of the cation source compounds were then mixed with distilled water (20 ml), ethylene glycol (40 ml) and glycine (0.02 mole) in a 100 ml beaker to form a precipitate-free starting solution. The starting solution was then heated on a hot plate at about 80° C. to expel the water and other volatile matter until it turned to a viscous liquid. The change in the viscosity of the solution as it was converted into the polymeric precursor was measured at room temperature by means of a Brookfield viscometer, Model No. DVII.

Deposition and Formation of the Dense Film

Figure 11A:
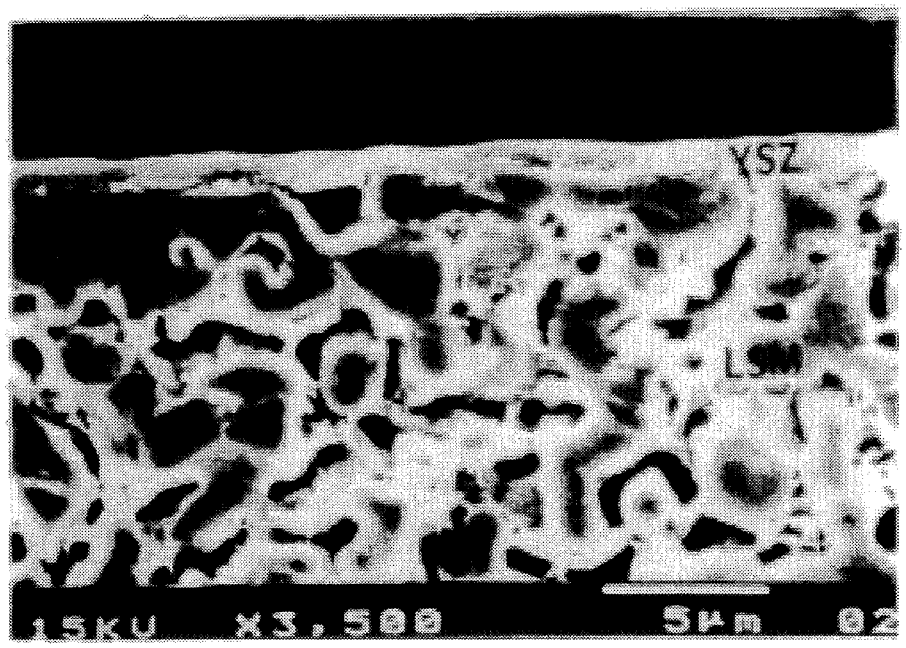
FIG. 11 (a) is the cross-section SEM photomicrograph of a YSZ oxide film deposited on a porous LSM substrate as prepared in Example 2.
Figure 11B:
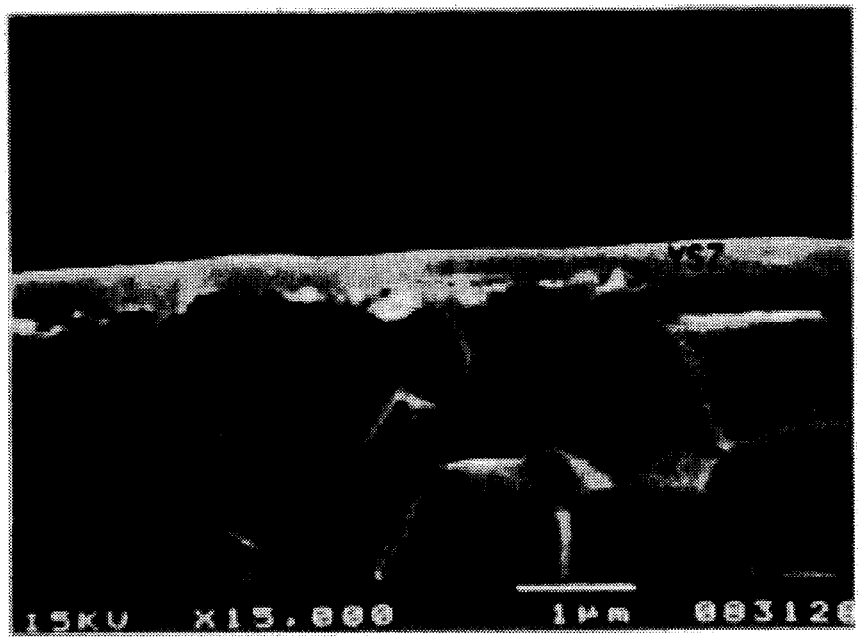

A spin-coating technique was used to deposit wet films of the precursor on porous LSM and dense LSCF substrates. In depositing a wet film of the precursor on a dense LSCF substrate, a precursor viscosity of about 90 cP at 25° C. was employed along with a spinning rate of about 2500 rpm for 20 seconds. The as-deposited films of the YSZ precursor were dried by placing the coated substrate on a hot plate at about 80° C. The dried films were then heat treated at about 320° C. to remove most of organic content and obtain a 0.1 μm thick film of the amorphous oxide. The process was repeated with successive spin-coatings of the precursor with drying and heating treatment after each coating until a continuous film of the desired thickness was obtained. To obtain a continuous film of YSZ on a porous LSM substrate the precursor viscosity was increased to about 190 cP at 25° C. and multiple depositions were employed. Crystallization and grain growth of the as deposited amorphous films were obtained through subsequent heat treatment. FIGS. 11 (a) and 11 (b) show the cross-section SEM photomicrographs of the YSZ oxide films deposited on porous LSM and dense LSCF substrates after 14 spin-coating cycles and 5 spin-coating cycles, respectively. A dense continuous YSZ oxide film of about 0.8 μm thickness was successfully deposited on the porous LSM substrate.

Characterization of the Films

Figure 13:
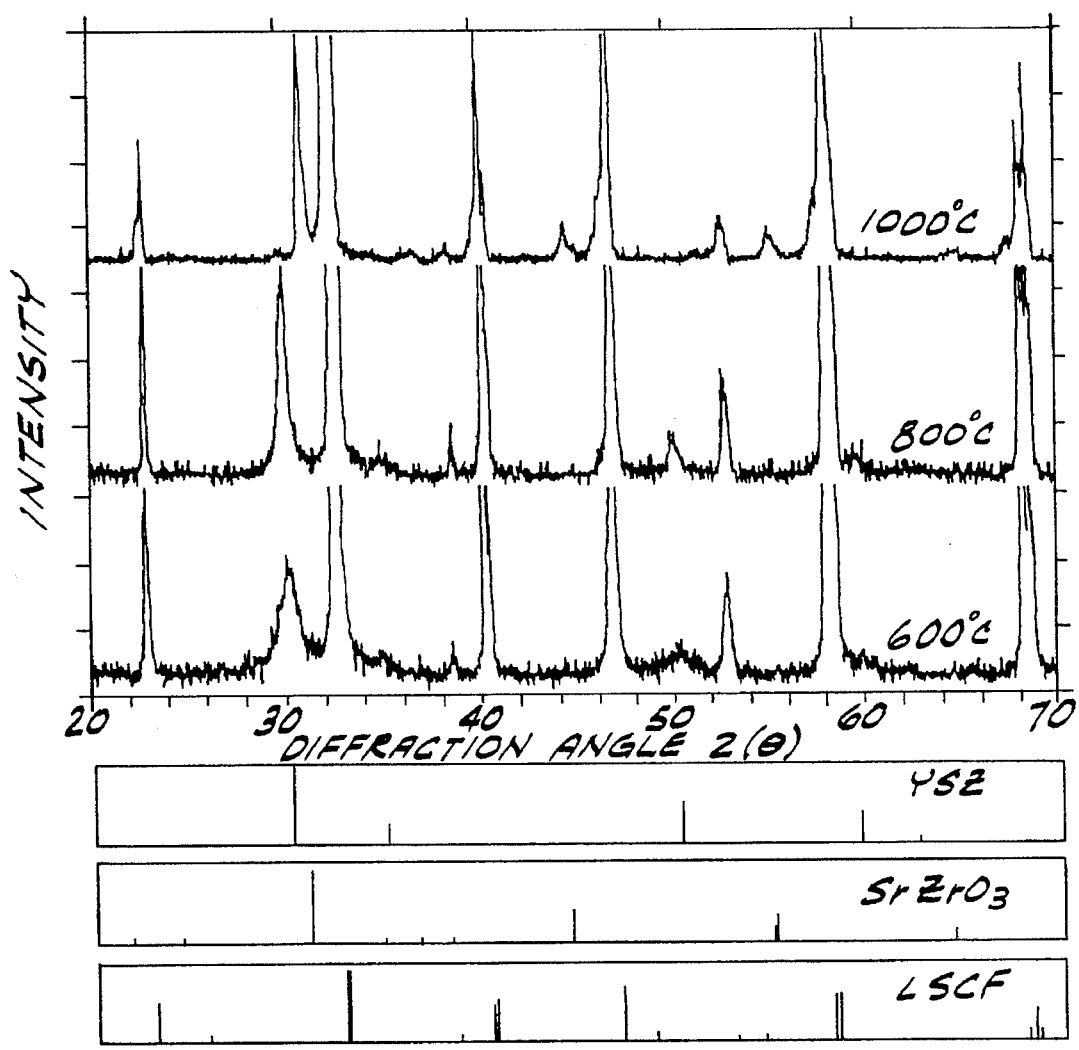
FIG. 13 is the x-ray diffraction patterns showing phase development and reaction of YSZ oxide films deposited on a dense LSCF substrate as prepared in Example 2.

The structural evolution of the as-deposited amorphous YSZ films during annealing at temperatures between 600° C. and 1200° C. was monitored by x-ray diffraction. The results for YSZ oxide films deposited on porous LSM substrates and for YSZ films deposited on dense LSCF substrates are shown in FIGS. 12 and 13 respectively. As shown in FIG. 12, fine-grain polycrystalline YSZ was detected on the porous LSM substrates at annealing temperature as low as 600° C. Grain growth of the YSZ oxide films was observed at higher temperatures. However, as shown in FIG. 13, when YSZ films were deposited on a dense LSCF substrate a reaction was detected at temperatures as low as 1000° C. This was eliminated by depositing a dense CSO oxide film as a buffer layer, as previously described, between the LSCF substrate and the YSZ oxide film. X-ray diffraction results show that CSO film is compatible with the LSCF cathode material. No reaction products were detected after annealing a LSCF substrate coated with a CSO oxide film at 1200° C. for 24 hours. The CSO buffer layer was found to eliminate the interactions between YSZ and LSCF at high temperatures and significantly reduced the cathode/electrolyte interfacial resistance.

EXAMPLE III

LSM Thin Film

Preparation of the Precursor Solution

A starting solution with a nominal La:Sr:Mn composition of 0.85:0.15:1 (molar ratio) was prepared using reagent grade $La_2(CO_3)_3.H_2O$, $SrCO_3$ and $MnCO_3$ as cation source compounds. These materials were standardized thermogravimetrically to confirm the actual cation contents. Appropriate quantities of these materials to include in the starting solution were calculated on the basis of obtaining 0.01 mole of the oxide having the desired nominal composition. Measured quantities of the cation source compounds were then mixed with 10 ml of distilled water and 20 ml of ethylene glycol in a 100 ml beaker. The carbonate cation source compounds were dissolved by the slow addition of 5 ml of concentrated nitric acid to the beaker to form a precipitate-free starting solution. The starting solution was heated on a hot plate at about 80° C. to expel the water and other volatile matter until it turned into a viscous liquid. The change in the viscosity of the solution as it was converted into the polymeric precursor was measured at room temperature by means of a Brookfield viscometer, Model No. DVII.

Deposition and Formation of the Dense Film

The spin-coating technique was used to form wet films of the LSM precursor on a dense YSZ substrate. In order to obtain a dense LSM oxide film 0.3 μm thick on a dense YSZ substrate, a precursor viscosity of about 190 cP at 25° C. and a spinning speed of about 2500 rpm for 20 seconds were employed.

Characterization of the Films

X-ray diffraction analysis of the LSM oxide film calcined at 600° C. showed only LSM and YSZ phases. A reaction between the LSM oxide film and the YSZ substrate occurred at 1050° C. forming $La_2Zr_2O_7$ at the interface. This could be a source for cathodic polarization and reduced cell efficiency. A dense CSO film was successfully deposited on a dense LSM substrate. X-ray diffraction results show that CSO oxide films are compatible with the LSM cathode material. No reaction products were detected after annealing the LSM/CSO system at 1200° C. for 24 hours. A CSO oxide film interposed between YSZ and LSM as a buffer layer has been found to eliminate the interactions between YSZ and LSM at high temperature.

EXAMPLE IV

LSCF Thin Film

Preparation of the Precursor Solution

A starting solution with a nominal La:Sr:Co:Fe composition of 0.6:0.4:0.2:0.8 (molar ratio) was prepared using reagent grade $La_2(CO_3)_3 \cdot xH_2O$, $SrCO_3$, $Co(CO_3) \cdot xH_2O$ and $Fe(NO_3)_3 \cdot xH_2O$ as cation source compounds. These materials were standardized thermogravimetrically to confirm the actual cation contents. Appropriate quantities of these materials to include in the starting solution were then calculated on the basis of obtaining 0.02 mole of the oxide having the desired nominal composition. Measured quantities of the cation source compounds were then mixed with 20 ml of distilled water and 40 ml ethylene glycol in a 100 ml beaker. The carbonate cation source compounds were then dissolved by the slow addition of 10 ml of concentrated nitric acid to the beaker to form a precipitate-free starting solution. After dissolution, 0.04 mole glycine was added. The starting solution was then heated at about 80° C. on a hot plate to expel the water and other volatile matter until it turned to a viscous liquid. The change in the viscosity of the solution as it was converted into the polymeric precursor was measured at room temperature by means of a Brookfield viscometer, Model No. DVII.

Deposition and Formation of the Dense Films

A spin-coating technique was used to form wet films of the LSCF precursor on a YSZ substrate. The film thickness was established by controlling the spinning speed, the spinning time and the viscosity of the precursor. In this example, a precursor viscosity of about 150 cP at 25° C., a spinning speed of 3000 rpm for 20 seconds, and an annealing temperature of 600° C. yields an oxide film about 0.1 µm thick for each coating. Thicker films were produced by multiple coatings with drying and heat treatment after each coating. Crystallization and grain growth of the as-deposited amorphous films were obtained by subsequent heat treatment. The average time for producing a dense, 0.5 µm thick film of LSCF on a YSZ substrate can be reduced to 5 to 10 minutes s by eliminating intermediate heat treatment cycles.

Characterization of the Films

Figure 14A:
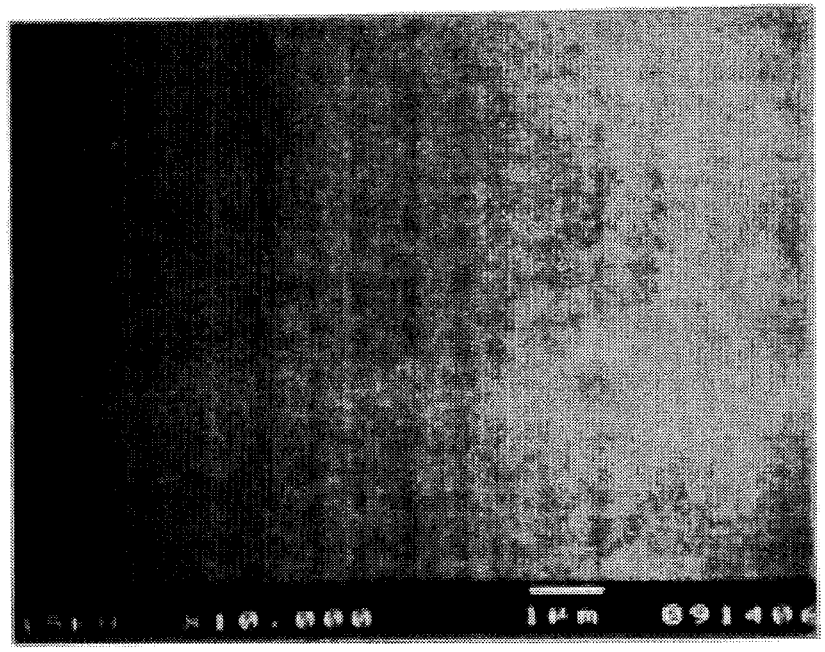
FIG. 14 (a) is a surface SEM of a LSCF oxide film deposited on a YSZ substrate after four spin-coatings and annealing at 600° C. for 2 hrs as prepared in Example 4.
Figure 14B:
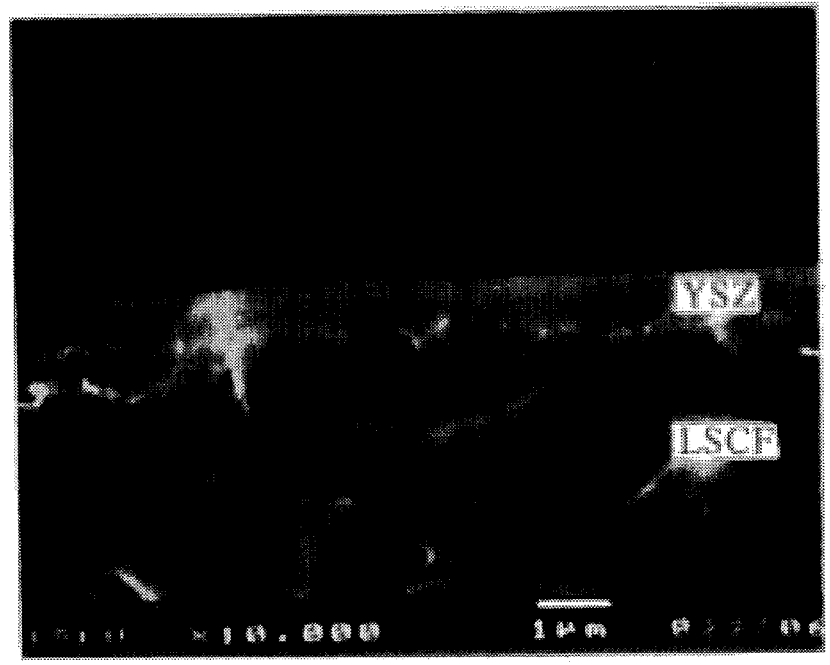
Figure 15:
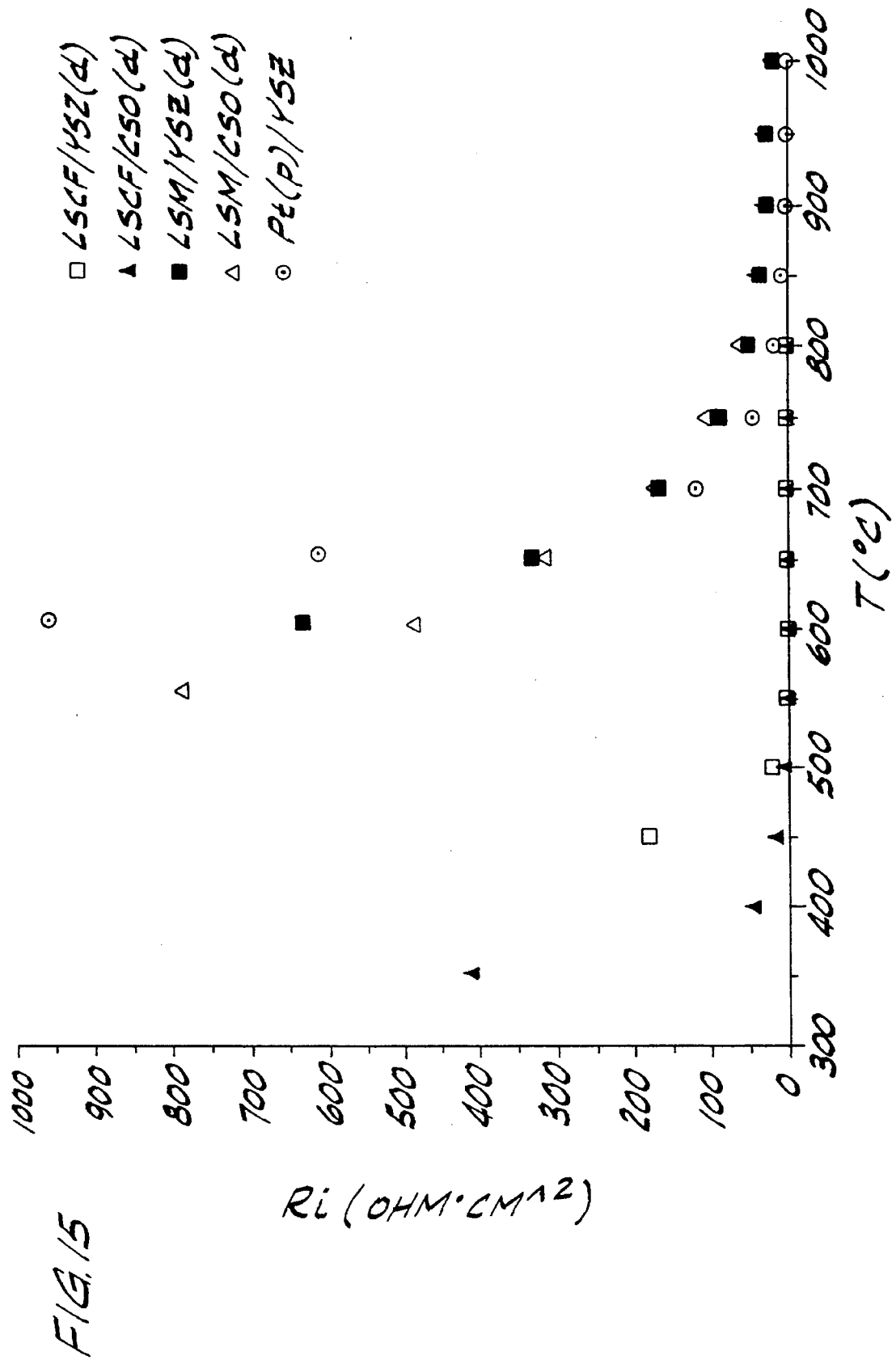
FIG. 15 is a graph of interfacial resistance (Ri) versus temperature (°C.) for various metal oxide systems.

FIGS. 14 (a) and (b), respectively, show typical surface and cross-section SEM micrographs of LSCF oxide films on a YSZ substrate after four spin-coatings and annealing at 600° C. for 2 hours. FIG. 14 (a) shows that the film is dense and free from microcracks and pinholes. The cross-section SEM micrograph in FIG. 14 (b), shows that the thickness of the LSCF oxide film is about 0.4 µm. The electrode characteristics of the dense LSCF films were investigated by AC impedance spectroscopy. FIG. 15 shows plots of the interfacial resistance, Ri, versus temperature for various oxide systems. The LSCF oxide film electrode deposited on both YSZ and CSO substrates possessed very low electrode resistance at temperatures as low as 500° C. In FIG. 15, the interfacial resistance using porous Pt and dense LSM oxide film electrodes deposited on different substrates are also shown for purposes of comparison. Both porous Pt and dense LSM electrodes deposited on YSZ or CSO substrates showed considerably higher interfacial resistance as compared to LSCF electrodes at temperatures up to 900° C. These results show that at temperature below 800° C., LSCF oxide film electrodes deposited on either CSO or YSZ substrates have lower interfacial losses as compared to either porous PT or LSM electrodes. Accordingly, the LSCF oxide film compositions are more promising than LSM, or even Pt, for SOFC cathode applications at temperatures between 600°–800° C.

In view of the above, it will be seen that the several objects of the invention are achieved.

As various changes could be made in the above methods without departing from the scope of the invention, it is intended that all matter contained in the above description be interpreted as illustrative and not in a limiting sense.

What is claimed is:

1. A method for preparing a component for a solid oxide fuel cell comprising a substrate coated with a polycrystalline metal oxide film, the oxide film being comprised of an oxide selected from the group consisting of $(CeO_2)_{1-x}(SmO_{1.5})_x$, $(ZrO_2)_{1-x}(YO_{1.5})_x$, $La_{1-x}Sr_xMnO_3$ and $La_{1-x}Sr_xCo_yFe_{1-y}O_3$, wherein x and y are between 0 and 1 and are selected to represent the nominal composition of the oxide film, the method comprising:

preparing a precipitate-free starting solution by dissolving metal cation source compounds for each of the metal constituents of the oxide film in an aqueous mixture comprising a polymerizable organic solvent, the cations of each metal being present in the starting solution in a molar ratio corresponding to the nominal composition of the oxide film;

heating the starting solution to form a polymeric precursor comprising a polymer containing the metal cations, the precursor being free of precipitates;

depositing the polymeric precursor onto a surface of the substrate;

spinning the substrate to thereby coat the substrate with a film of the polymeric precursor; and calcining the deposited film of polymeric precursor in the presence of oxygen and at a temperature not in excess of 600° C. to convert the film of polymeric precursor into the polycrystalline metal oxide film, the oxide film having an average grain size less than about 0.5 µm and being substantially free of cracks or pinholes.

2. A method for preparing a gas separation membrane for selectively transferring a component of a gaseous mixture across the membrane, the membrane comprising a polycrystalline metal oxide film, the method comprising:

preparing a precipitate-free starting solution by dissolving at least one metal cation source compound in an aqueous mixture comprising a polymerizable organic solvent;

heating the starting solution to form a polymeric precursor comprising a polymer containing the metal cations, the precursor being free of precipitates;

depositing a film of the polymeric precursor onto a surface of a porous substrate, the porosity of the substrate being sufficient to allow transport of the selected component of the gas mixture across the membrane; and calcining the deposited film of polymeric precursor in the presence of oxygen to convert the film of polymeric precursor into the polycrystalline metal oxide film, the oxide film being substantially free of cracks or pinholes.

3. The method of claim 2 wherein the porous substrate has an average pore diameter in excess of about 5 μm.

4. The method of claim 2 wherein the polymerizable organic solvent is ethylene glycol.

5. The method of claim 2 wherein a pH control agent selected from the group consisting of nitric acid, citric acid, hydrochloric acid, glycine, ammonium hydroxide and ethylene diamine is added to the starting solution to inhibit the formation of precipitates.

6. The method of claim 2 wherein the film of the polymeric precursor is deposited onto a surface of a porous substrate by spin-coating the substrate with the polymeric precursor.

7. The method of claim 6 wherein the viscosity of the polymeric precursor is between about 90 and 190 cP at 25° C.

8. The method of claim 7 wherein the substrate is spun at a rate between about 1500 and about 3000 rpm.

9. The method of claim 2 wherein the oxide comprises two or more metal constituents, the cations of each metal being present in the starting solution in a molar ratio corresponding to the nominal composition of the oxide film.

10. The method of claim 2 wherein the cation source compound is selected from the group consisting of carbonates, nitrates, chlorides and hydroxides of the oxide's metal constituents.

11. The method of claim 2 wherein the deposited film of polymeric precursor is dried at a temperature not in excess of about 80° C. to substantially remove remaining solvent from the precursor prior to calcining the coated substrate.

12. The method of claim 2 wherein the deposited film of polymeric precursor is calcined at a temperature not in excess of 600 ° C.

13. The method of claim 12 wherein the oxide film exhibits a polycrystalline microstructure having an average grain size less than about 0.5 μm.

14. A method for preparing a gas separation membrane for selectively transferring oxygen from a gaseous mixture across the membrane, the membrane comprising a polycrystalline metal oxide film of $(ZrO_2)_{1-x}(YO_{1.5})_x$ or $La_{1-x}Sr_xCo_yFe_{1-y}O_3$, wherein x and y are between 0 and 1 and are selected to represent the nominal composition of the oxide, the method comprising:

preparing a precipitate-free starting solution by dissolving source compounds for cations of Zr and Y or La, Sr, Co and Fe in an aqueous mixture comprising a polymerizable organic solvent;

heating the starting solution to form a polymeric precursor comprising a polymer containing the metal cations, the precursor being free of precipitates;

depositing a film of the polymeric precursor onto a surface of a porous substrate, the porosity of the substrate being sufficient to allow transport of oxygen across the substrate/membrane boundary; and calcining the deposited film of polymeric precursor in the presence of oxygen to convert the film of polymeric precursor into the polycrystalline metal oxide film, the oxide film being substantially free of cracks or pinholes.

15. The method of claim 14 wherein the porous substrate has an average pore diameter in excess of about 5 μm.

16. The method of claim 15 wherein the gaseous mixture is air.

* * * * *